US010210493B2

(12) United States Patent
Redd et al.

(10) Patent No.: US 10,210,493 B2
(45) Date of Patent: Feb. 19, 2019

(54) ROUTING AN IMAGE WITHIN A NETWORK

(71) Applicant: BANK OF AMERICA CORPORATION, Charlotte, NC (US)

(72) Inventors: Laura J. Redd, Charlotte, NC (US); Clarence Edward Lee, II, Mansfield, TX (US); Todd E. Ratts, Littleton, CO (US)

(73) Assignee: Bank of America Corporation, Charlotte, NC (US)

( * ) Notice: Subject to any disclaimer, the term of this patent is extended or adjusted under 35 U.S.C. 154(b) by 248 days.

(21) Appl. No.: 15/200,496

(22) Filed: Jul. 1, 2016

(65) Prior Publication Data

US 2018/0005205 A1    Jan. 4, 2018

(51) Int. Cl.
  *G06Q 20/40* (2012.01)
  *G06Q 20/32* (2012.01)
  *G06Q 40/02* (2012.01)
  *G06Q 20/10* (2012.01)
  *G06Q 20/04* (2012.01)

(52) U.S. Cl.
  CPC ......... *G06Q 20/108* (2013.01); *G06Q 20/042* (2013.01); *G06Q 20/10* (2013.01); *G06Q 20/32* (2013.01); *G06Q 20/3221* (2013.01); *G06Q 20/3223* (2013.01); *G06Q 20/40* (2013.01); *G06Q 20/401* (2013.01); *G06Q 40/02* (2013.01)

(58) Field of Classification Search
  None
  See application file for complete search history.

(56) References Cited

U.S. PATENT DOCUMENTS

| | | |
|---|---|---|
| 7,885,451 B1 | 2/2011 | Walls et al. |
| 7,885,880 B1 | 2/2011 | Prasad et al. |
| 7,912,785 B1 | 3/2011 | Kay |
| 7,949,587 B1 | 5/2011 | Morris et al. |
| 8,244,638 B2 | 8/2012 | Agarwal et al. |
| 8,290,237 B1 | 10/2012 | Burks et al. |
| 8,380,626 B2 | 2/2013 | Huff et al. |
| 8,392,332 B1 | 3/2013 | Oakes, III et al. |
| 8,433,127 B1 | 4/2013 | Harpel et al. |
| 8,768,836 B1 | 7/2014 | Acharya |
| 9,148,569 B2 | 9/2015 | Resende et al. |
| 2005/0097046 A1* | 5/2005 | Singfield .............. G06Q 20/042 705/42 |
| 2014/0279480 A1 | 9/2014 | Narendra et al. |

* cited by examiner

*Primary Examiner* — Joseph W. King
(74) *Attorney, Agent, or Firm* — Michael A. Springs

(57) ABSTRACT

A system for routing an image file in a network includes primary network resources, secondary network resources, and an image routing processor that receives the image file from a user device via the primary network resources, creates an association in real-time between the image file and an image address that facilitates retrieving the image file from a repository of a financial institution, communicates a message enabling the user device to use the image address to immediately retrieve the image file stored in the repository of the financial institution, receives a user request to retrieve the image file associated with the image address, uses the image address to retrieve the image file from the repository of the financial institution, and routes the image file prior to the secondary network resources posting a financial transaction based on a financial instrument depicted in the image file.

17 Claims, 3 Drawing Sheets

ROUTING AN IMAGE WITHIN A NETWORK

TECHNICAL FIELD

The present disclosure relates generally to networks, and more specifically to routing an image within a network.

BACKGROUND

Networks allow users to access various types of network services for sharing information with each other. The network services may accomplish information sharing by routing information between different components within the network. In certain circumstances, routing may introduce latencies that delay when the user receives information from the network. As a result of the latencies, users may be reluctant to use the network services. Thus, it is desirable to efficiently route information in a network.

SUMMARY

In certain embodiments, a system for routing an image file in a network comprises primary network resources, secondary network resources, and an image routing processor. The primary network resources are configured to receive an image file. The image file depicts a financial instrument and is received from a user device. The primary network resources are further configured to facilitate retrieval of the image file by the user device. The secondary network resources are configured to transact a financial transaction based on the financial instrument depicted in the image file. The image routing processor is configured to receive the image file from the user device via the primary network resources and create an association between the image file and an image address that facilitates retrieving the image file from a repository of a financial institution. The association is created in real-time in response to receiving the image file. The image routing processor is further operable to communicate a message to the user device via the primary network resources. The message enables the user device to use the image address to immediately retrieve the image file stored in the repository of the financial institution. The image routing processor is further operable to receive a user request to retrieve the image file associated with the image address, use the image address to retrieve the image file from the repository of the financial institution, and route the image file from the repository of the financial institution to the user device via the primary network resources. The image file is routed to the user device prior to posting of the financial transaction by the secondary network resources.

Certain embodiments may present one or more technical advantages. In an embodiment, delays associated with routing an image file in a network may be reduced. For example, in certain embodiments an image file depicting a financial instrument may be received from a user device, stored in a repository of the financial institution; and routed from the repository of the financial institution back to the user device prior to transacting the financial instrument depicted in the image file. Faster routing may tend to increase user confidence, which may encourage users to use the network more often. In certain embodiments, faster routing may allow users to verify the contents of the image file prior to the posting of the financial transaction. In certain embodiments, network performance may be improved by creating an association between an image file and an image address that facilitates efficiently retrieving the image file from a repository of a financial institution.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Routing an image file in a network presents certain technical problems and challenges. For example, an image file may be used to initiate a network process. Routing the image file may require the network process to be completed before the image file can be routed to a user. For example, the image file may lack uniquely identifiable characteristics and may therefore be difficult for a routing system to locate and route to the user. Although uniquely identifiable characteristics can be assigned when performing the network process, waiting for the network process to complete can introduce undesirable delays. Embodiments of the present disclosure may provide solutions to this problem. In certain embodiments, an image file is associated with an image address in real-time in response to receiving the image file from a user device. The image address can then be used to route the image file to the user device prior to completing the network process initiated by the network in response to receiving the image file.

In certain embodiments, a system for routing an image file in a network comprises primary network resources, secondary network resources, and an image routing processor. The primary network resources are configured to receive an image file. The image file depicts a financial instrument and is received from a user device. The primary network resources are further configured to facilitate retrieval of the image file by the user device. The secondary network resources are configured to transact a financial transaction based on the financial instrument depicted in the image file. The image routing processor is configured to receive the image file from the user device via the primary network resources and create an association between the image file and an image address that facilitates retrieving the image file from a repository of a financial institution. The association is created in real-time in response to receiving the image file. The image routing processor is further operable to communicate a message to the user device via the primary network resources. The message enables the user device to use the image address to immediately retrieve the image file stored in the repository of the financial institution. The image routing processor is further operable to receive a user request to retrieve the image file associated with the image address, use the image address to retrieve the image file from the repository of the financial institution, and route the image file from the repository of the financial institution to the user device via the primary network resources. The image file is routed to the user device prior to posting of the financial transaction by the secondary network resources.

Figure 1:
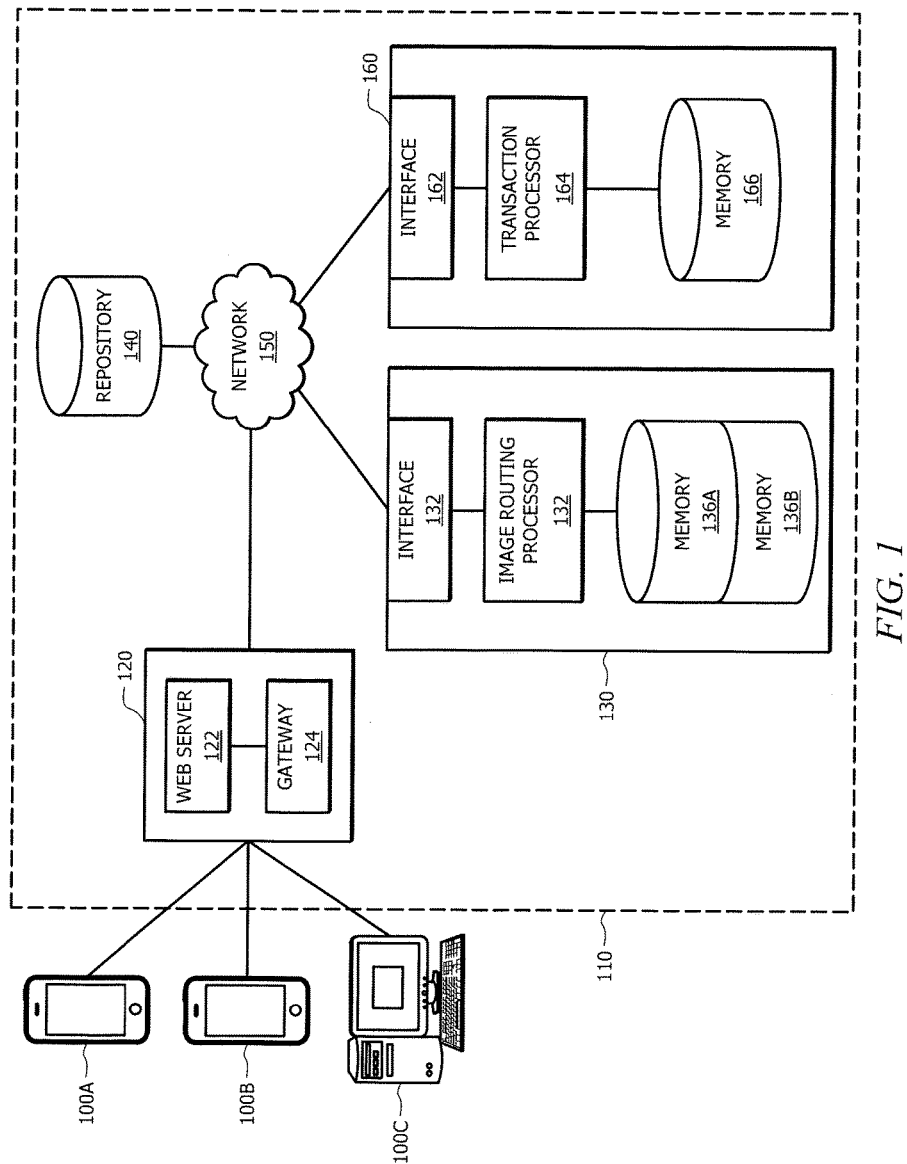
FIG. 1 illustrates an example of a system for routing an image file in a network, in accordance with certain embodiments of the present disclosure.

FIG. 1 illustrates an example of a system 110 for routing an image file in a network, in accordance with certain embodiments of the present disclosure. System 110 may comprise one or more primary network resources 120, image routing resources 130, repository 140, network 150, and/or secondary network resources 160. In general, system 110 receives an image file from a user device 100 via primary network resources 120 and stores the image file in repository 140. Image routing resources 130 associate the image file with an image address that facilitates retrieving the image file from repository 140. Image routing resources 130 also communicate a message that enables the user device 100 to immediately retrieve the image file stored in repository 140 using the image address. Thus, the user device 100 may retrieve the image file stored in repository 140 prior to the image being processed by secondary network resources 160 of system 110.

In certain embodiments, the components of system 110 may be associated with an enterprise, such as a bank or other financial institution. A customer of the bank may interact with system 110 via user device 100 in order to access one or more financial accounts that the customer maintains with the bank, such as a checking account, savings account, credit account, debit account, etc. As an example, the customer may interact with system 110 in order to deposit a check into the customer's financial account. The customer uses an input interface of user device 100 to obtain an image file that depicts the check. For example, the customer could use a camera or scanner of user device 100 to take a picture of the check. The customer then instructs user device 100 to send the picture of the check to the bank. The bank receives the picture of the check via primary network resources 120 and stores it in repository 140. Image routing resources 130 associate the picture of the check with an image address. The image address facilitates retrieving the picture of the check from repository 140. Image routing resources 130 then communicate a message that enables the user device 100 to use the image address to retrieve the picture of the check from repository 140 immediately (e.g., within a few seconds or a few minutes of the customer sending the image file to system 110 via user device 100). Thus, the user device 100 may retrieve the picture of the check as stored in repository 140 without having to wait for the check to be posted by secondary network resources 160. Because the customer can immediately see that the bank has the check in its system and is processing it, rather than having a delay on the order of a day or more waiting for the check to post, the customer may have improved confidence when using user device 100 to conduct financial transactions.

User device 100 refers to any type of device communicating with system 110 through a network. Examples of user device 100 include a mobile phone, smart phone, tablet, laptop, personal computer, handheld device, etc. Primary network resources 120, image routing resources 130, and secondary network resources 160 each refer to any suitable hardware and/or software configured to perform the described functionality, such as a server (e.g., network server, remote server, web server, or file server, etc.), a mainframe, a host computer, a workstation, a personal computer, or any other suitable device. Primary network resources 120, image routing resources 130, and/or secondary network resources 160 may be implemented using shared hardware (e.g., more than one type of resources could be implemented on one computer) or separate hardware (e.g., the different types of resources could be distributed throughout network 150).

User devices 100, primary network resources 120, image routing resources 130, and secondary network resources 160 may each include one or more interfaces, processors, and/or memories. An interface receives input, sends output, processes the input and/or output and/or performs other suitable operations. An interface may comprise hardware and/or software. A processor controls the operation and administration of user device 100 by processing information received from an interface and/or memory. Memory stores, either permanently or temporarily, data, operational software, or other information for processor.

Examples of interfaces include user interfaces and network interfaces. Examples of user interfaces include one or more graphical user interfaces (GUIs), displays, buttons, printers, microphones, speakers, cameras, scanners, credit card readers, check readers, and so on. Network interfaces receive information from a network, transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows the processor to exchange information with or through a network.

A processor communicatively couples to interface(s) and memory, and includes any hardware and/or software that operates to control and process information. The processor may be a programmable logic device, a microcontroller, a microprocessor, any suitable processing device, or any suitable combination of the preceding.

Memory includes any one or a combination of volatile or non-volatile local or remote devices suitable for storing information. For example, memory may include Read Only Memory ("ROM"), Random Access Memory ("RAM"), magnetic storage devices, optical storage devices, or any other suitable information storage device or a combination of these devices. Memory may include any suitable logic. Logic generally refers to rules, algorithms, code, tables, and/or other suitable instructions embodied in a non-transitory, computer-readable storage medium for performing the described functions and operations when executed by a processor. An example of logic may include an application or "app" run by user device 100.

In general, primary network resources 120 facilitate interactions between system 110 and user devices 100. Primary network resources may comprise any suitable components for sending/receiving information, such as an image file, to/from user devices 100. Optionally, primary network resources may include components for authenticating user device 100. In certain embodiments, primary network resources 120 include a web server 122, a gateway 124, and/or any suitable network components (e.g., communication paths, protocol converters, routers, etc.). Gateway 124 may establish secure communication between a user device 100 and system 110. Web server 122 may allow for communicating web content in a format compatible with user device 100.

Image routing resources 130 receive an image file from user device 100 via primary network resources 120. The image file may be received directly or indirectly from primary network resources 120 via interface 132. An example of indirect receipt may involve receiving from repository 140 an image file that repository 140 received from primary resources 120. Image routing resources 130 include an image routing processor 134 operable to create an association between the image file and an image address so that the image file can be efficiently routed to user device 100. For example, in certain embodiments, image routing processor 134 is operable to perform the method described with respect to FIG. 2 below.

Image routing resources 130 may include memory 136. Memory 136 may include a cache that facilitates immediate access of the image file by user device 100. Optionally, memory 136 comprises a first cache (e.g., memory 136*a*) and a second cache (e.g., memory 136*b*). As an example, an image file may depict a financial instrument for a financial transaction to be transacted by secondary network resources 160. The first cache may be used to route the image file to user device 100 prior to the financial transaction posting and the second cache may be used to route the image file to user device 100 after the financial transaction posting.

Repository 140 may be any suitable memory that stores the image file for system 110. In some embodiments, repository 140 comprises a high availability repository that persists the image file and facilitates immediate access of the image file by user device 100.

Network 150 represents any suitable network operable to facilitate communication between the components of system 110. Network 150 may include any interconnecting system capable of transmitting audio, video, signals, data, messages, or any combination of the preceding. Network 150 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

As discussed above, image routing resources 130 may receive an image file that depicts a financial instrument and route the image file to user device 100 before the financial instrument has been transacted. The financial instrument may be transacted by secondary network resources 160. Secondary network resources 160 may include interface 162, transaction processor 164, and memory 166. Transaction processor 164 may receive transaction information via interface 162. Transaction information may include information such as the monetary amount of the transaction, the type of transaction (e.g., deposit or withdrawal), the bank account to/from which funds are being transferred, etc. Transaction processor 164 follows logic stored in memory 166 to process the transaction based on the received transaction information. Transaction processor 164 may output transaction results via interface 162. For example, transaction processor 164 may output a posting identifier and a posting date. The transaction results may be associated with the image file, for example, as metadata.

In certain embodiments, system 110 can route an image file to a user device 100 other than the user device from which the image file was received. For example, system 110 may receive the image file from user device 100*a* and route the image file to user device 100*b* (which could be a device associated with another person that the user has authorized to access the user's banking account, such as a spouse, parent, joint owner of the bank account, etc.) or user device 100*c* (which could be another device that the user utilizes to login to system 110, for example, user device 100*a* could be the user's smart phone and user device 100*c* could be the user's computer).

Figure 2:
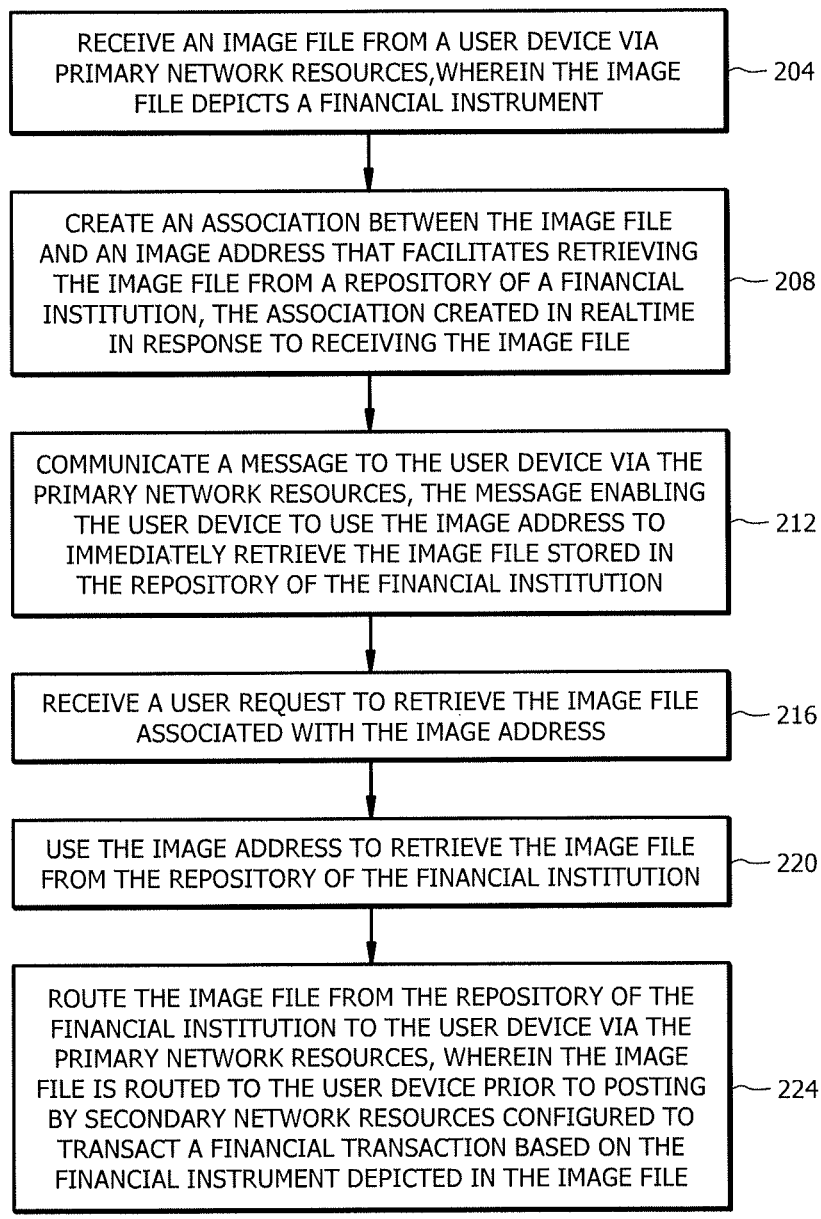
FIG. 2 illustrates an example of a method for routing an image file in a network, in accordance with certain embodiments of the present disclosure.

FIG. 2 illustrates an example of a method 200 for routing an image file in a network, in accordance with certain embodiments of the present disclosure. In certain embodiments, the method may be performed by system 110 of FIG. 1. At step 204, the method receives an image file from a user device 100 via primary network resources 120. For example, a user may submit a request to transact a financial instrument via a user device, such as a smartphone, tablet, etc. In certain embodiments, the user initiates the request by launching a mobile banking app, logging into the app, and providing information about the transaction. The request may include an image file that depicts the financial instrument to be transacted. Any suitable financial instrument may be depicted. As an example, the financial instrument may be a check that names the user as a payee, and the financial transaction may be to deposit the check into the user's bank account. The image file may depict the front and back sides of the check. The image file may comprise one or more electronic files. As an example, an image file may include a first electronic file depicting the front of a check and a second electronic file depicting the back of the check. Or, a single electronic file could depict the front and back of the check.

In some embodiments, in response to receiving the image file, the method confirms in real-time whether the image file received from user device 100 is readable and communicates a request for user device 100 to send an updated image file in response to a determination that the image file is not readable. The method may then delete the unreadable image file and store the readable, updated image file in repository 140 such that the transaction can proceed with a readable version of the financial instrument.

At step 208, the method creates an association between the image file and an image address. The image address comprises a unique identifier that facilitates retrieving the image file from a repository 140 of a financial institution, such as a repository of the user's bank. In certain embodiments, the unique identifier comprises a character string of numbers, letters, and/or symbols that an image routing processor 134 assigns when the user initiates a financial transaction. The character string may be generated at random or generated sequentially (e.g., a first image file may be assigned identifier "A," and a second image file could be assigned identifier "B," and so on). In certain embodiments, the unique identifier may further comprise information about the financial transaction associated with the image file, such as the date of the transaction request, monetary amount of the transaction request, and/or user information (e.g., payee, payer, bank account number, etc.). The method creates the image address in real-time in response to receiving the image file. Thus, the image address may be distinct from a posting number that does not get assigned until after some delay while waiting for the transaction to complete the posting process. In certain embodiments, the image address may comprise metadata associated with the image file.

At step 212, the method communicates a message to user device 100 via the primary network resources 120. The message enables user device 100 to use the image address to immediately retrieve the image file stored in repository 140 of the financial institution. For example, the method may communicate the message as a text message or email with a link to the image file. The link may include the image address itself, or the link may include information that enables system 110 to correlate the link to the image address.

In addition, or in the alternative, certain embodiments of the method communicate the message to a second user device that is different from the user device that originally sent the image file to system 110. The second user device may be another device associated with the user, such as a different smartphone, tablet, computer, etc. that the user utilizes to login to his/her bank account, or a device associated with another person that the user has authorized to access the user's banking account, which could be a spouse, parent, joint owner of the bank account, etc.

At step 216, the method receives a user request to retrieve the image file associated with the image address. As an example, the user may activate a link received in the message of step 212 by clicking the link, copying the link into a web browser, etc. In certain embodiments, activating the link initiates an application (e.g., a mobile banking app) that authenticates user device 100 prior to the image file being routed to the user device. As examples, the application may require the user to enter a username and/or passcode if the user is not currently logged into the application, if a pre-determined amount of time has passed since the user was last authenticated, or each time the user activates the link. Activating the link may communicate the user request message to system 110. The user request message may itself include the image address or may include information that enables system 110 to correlate the request to the image address.

At step 220, the method uses the image address to retrieve the image file from repository 140 of the financial institution, and at step 224 the method routes the image file from the repository 140 of the financial institution to the user device 100 via primary network resources 120. The image file is routed to user device 100 prior to secondary network resources 160 posting the financial transaction based on the financial instrument depicted in the image file. As an example, suppose the image file depicts a check for $10 to be deposited into the user's bank account. The method may receive the image file from user device 100 (step 204), retrieve the image file from repository 140 (step 220), and route the image file to user device 100 (step 224) prior to the $10 being deposited in the user's bank account. User device 100 displays the image file depicting the financial instrument to the user. As an example, the image file may depict the front and back sides of a check. User device 110 may allow the user to show or hide the image file (e.g., using expand and collapse functionality), toggle between the front and back view of the check, view the front and back views side-by-side, or display the image file to the user in any other suitable manner. By routing the image file from the financial institution's repository 140 in real-time, the user may have added comfort that the financial institution successfully received the image file depicting the financial instrument. Thus, the user may be more likely to utilize user device 100 to transact a financial instrument. In addition, in certain embodiments, the method allows the user to verify that the he/she sent the correct image file to the financial institution. If the user discovers that he/she sent an incorrect image file, the user can have the opportunity to replace it with the correct image file before the posting process is initiated. For example, in certain embodiments, user device 100 can send an updated image file during a pre-determined time period prior to secondary network resources 160 initiating the financial transaction, and replace the original image file with the updated image file. Any pre-determined time period may be configured, such as 5, 10, 15, 20, 30, 60, or 120 minutes, or other suitable time period.

In certain embodiments, the method may be capable of routing the image file from repository 140 of the financial institution to a second user device prior to the posting of the financial transaction. This may allow the user the flexibility of accessing the image file from multiple devices and/or may allow joint owners of a bank account to all be aware of a pending transaction. For example, the image file could be communicated to user device 100 via a first online account associated with a first owner of a joint banking account and to the second user device via a second online account associated with a second owner of the joint banking account.

In certain embodiments, the method can route the image file from repository 140 to user device 100 via a first cache (e.g., memory 136a) prior to the posting of the financial transaction and can route the image file from repository 140 to user device 100 via a second cache (e.g., memory 136b) in response to a second user request received after the posting of the financial transaction. For example, the first cache may comprise pending transactions and the second cache may comprise posted transactions. The second cache may facilitate communicating the image file to user device 100 with posting information, such as the date of posting, a posting identifier, etc. Alternatively, the same cache could be used to route the image file both before and after posting the financial transaction. The cache(s) may be implement using any suitable components, for example, the cache(s) could be implemented in repository 140 or image routing resources 130. As used herein, image file may refer to the original image and/or a copy of the image. For example, the original image could be stored in repository 140 and a copy of the image could be routed to user device 100.

Figure 3:
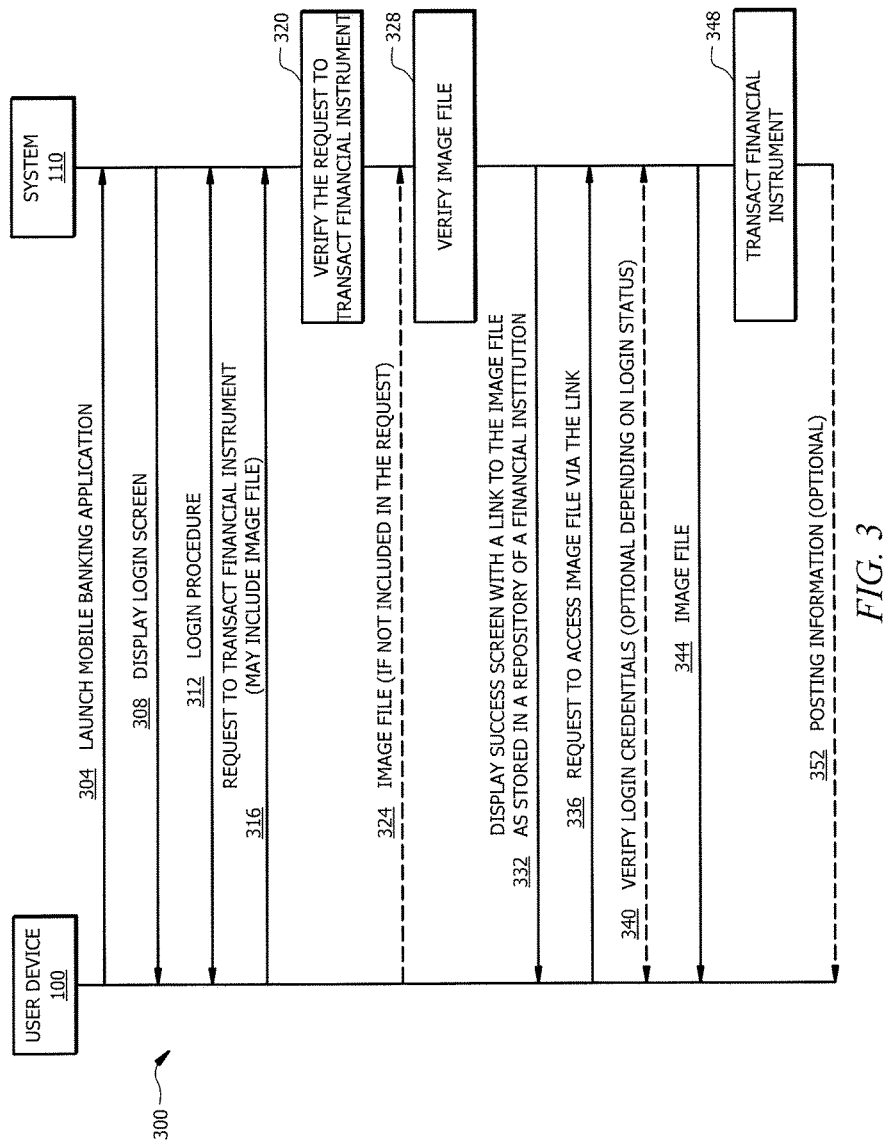
FIG. 3 illustrates an example of a signal flow between a user device and a system, in accordance with certain embodiments of the present disclosure.

FIG. 3 illustrates an example of a signal flow 300 between user device 100 and system 110, in accordance with certain embodiments of the present disclosure. At step 304, user device 100 informs system 110 that a user has launched a mobile banking application on device 100. At step 308, system 110 instructs user device 100 to display a login screen to the user. At step 312, user device 100 and system 110 perform a login procedure. For example, user device 100 collects login credentials (e.g., a passcode) from the user and communicates the login credentials to system 110. System 110 verifies the login credentials.

At step 316, user device 110 requests to transact a financial instrument. In some embodiments, the request may include information about the transaction (e.g., monetary amount of the transaction, whether to use the user's checking or savings account for the transaction, etc.) and may optionally include an image file depicting the financial instrument.

At step 320, system 110 verifies the request to transact the financial instrument. In certain embodiments, system 110 may verify that it has received all the information needed to proceed with the transaction and/or that there are not any inconsistencies in the information received. As an example, if the user entered in $20 as the monetary amount of the transaction and system 110 read $10 as the amount from the image file, system 110 may ask the user to correct the inconsistency by re-entering the monetary amount or sending an updated image file, such as an image file that is more readable or is a replacement image file if the user inadvertently submitted the incorrect file.

Verifying the request in step 320 may optionally include sending user device 100 instructions to provide the image file, for example, if the image file was not included in step 316. If the image file was not included with the request sent in step 316, user device 100 sends the image file to system 110 at step 324, and system 110 verifies the image file at step 328. System 110 may verify that the image file is received, is readable, and/or is consistent with information entered by the user.

At step 332, system 110 instructs device 110 to display a success screen with a link to the image file as stored in a repository 140 of a financial institution. As an example, the financial institution could be a bank that provides mobile banking services via system 110. At step 336, user device 100 requests to access the image file by activating the link received at step 332. At step 340, system 110 optionally verifies login credentials of user device 100 depending on the login status of the user. As examples, the application may require the user to enter a username and/or passcode if the user is not currently logged into the application, if a predetermined amount of time has passed since the user was last authenticated, or each time the user activates the link.

If user device 100 is authenticated, system 110 sends the image file from repository 140 to user device 100 at step 344. The image file may be sent in real-time the same day that system 110 receives the request of step 316 and prior to system 110 transacting the financial instrument at step 348. Thus, the user may view the image of the financial instrument from the financial institution's records while the transaction is pending, prior to posting. After system 110 transacts the financial instrument at step 348, system 110 may optionally send posting information to user device 110 at step 352. The posting information could include the posting date, a posting identifier, and/or other suitable information. If the user wishes to view the image file after the transaction has posted, system 110 may optionally allow user device 110 to continue to access the image file via the link sent in step 332 and/or may provide another link or other information for accessing the image file.

Certain embodiments of the present disclosure may provide one or more advantages. For example, in an effort to drive check deposits out of financial centers and into mobile channels, it may be important to increase customer confidence of using mobile check deposit. One tactic for increasing customer confidence is to show customers the digital image of the check immediately, so that the customers can see that the bank has the check in its system and is processing it. For example, an email or other message confirming that a request for a mobile deposit was successfully received may include a deep link that launches a mobile app (if viewed from a mobile device) or online banking (if viewed from a desktop or laptop computer) for the user to authenticate and then see the processing of the digital check image being processed by the bank's mobile check deposit system. The digital check image can be made available intraday (prior to the check posting) in both the mobile app and online banking. For example, an activity list available in the mobile app and online banking platform can provide information for a transaction in progress, including the ability to view the digital image of the check. Certain embodiments may have all, some, or none of these advantages. Other advantages may be apparent to those of ordinary skill in the art.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order unless explicitly stated otherwise. As an example, although FIG. 3 illustrates that user device 100 performs a login procedure (steps 308-312) prior to requesting a transaction (steps 316-328), in an alternative embodiment the login procedure may be prompted later, for example, in response to user device requesting the transaction (steps 316-328).

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A system for routing an image file in a network, the system comprising:
   primary network resources configured to receive the image file from a user device and facilitate retrieval of the image file by the user device, wherein the image file depicts a financial instrument for deposit into a financial account of the user;
   secondary network resources configured to transact a financial deposit transaction based on the financial instrument depicted in the image file; and
   an image routing processor configured to:
   receive the image file from the user device via the primary network resources;
   before the secondary network resources post the financial deposit transaction, create an association between the image file and an image address that facilitates retrieving the image file by the user from a repository of a financial institution, the association created in response to receiving the image file;
   after receiving the image file from the user device, communicate a message to the user device via the primary network resources, where the user device is configured to use the image address to retrieve the image file stored in the repository of the financial institution before the secondary network resources post the financial deposit transaction, where the message comprises a link that, when activated by the user, initiates a software application that authenticates the user device prior to the image file being routed to the user device;
   receive a user request to retrieve the image file associated with the image address before the secondary network resources post the financial deposit transaction where the request is initiated by activation of the link by the user to authenticate the user device and the request includes image information to enable the primary network resources to correlate the request to the image address;
   after authentication of the user device, use the image information in the request to retrieve the image file from the image address in the repository of the financial institution before the secondary network resources post the financial deposit transaction; and
   route the image file from the repository of the financial institution to the user device via the primary network resources, wherein the image file is routed to the user device prior to posting of the financial deposit transaction by the secondary network resources.

2. The system of claim 1, further operable to route the image file from the repository of the financial institution to a second user device prior to the posting of the financial deposit transaction.

3. The system of claim 2, wherein the image file is communicated to the user device via a first online account associated with a first owner of a joint banking account and to the second user device via a second online account associated with a second owner of the joint banking account.

4. The system of claim 1, wherein the system routes the image file from the repository to the user device via a first cache prior to the posting of the financial deposit transaction and the system is further operable to route the image file from the repository to the user device via a second cache in response to a second user request received after the posting of the financial deposit transaction.

5. The system of claim 1, further operable to:
allow the user device to send an updated image file during a pre-determined time period prior to the secondary network resources initiating the financial deposit transaction; and
replace the original image file with the updated image file.

6. The system of claim 1, wherein the system is further operable to confirm whether the image file is readable in real-time in response to receiving the image file and communicate a request for the user device to send an updated image file in response to a determination that the image file is not readable.

7. A non-transitory computer readable medium comprising logic that, when executed by an image routing processor, is operable to:
receive an image file from a user device via primary network resources in a network, wherein the image file depicts a financial instrument for deposit into a financial account of the user, where the network further comprises secondary network resources, the primary network resources configured to receive the image file from the user device and facilitate retrieval of the image file by the user device, the secondary network resources configured to transact a financial deposit transaction based on the financial instrument depicted in the image file;
before the secondary network resources post the financial deposit transaction, create an association between the image file and an image address that facilitates retrieving the image file by the user from a repository of a financial institution, the association created in real-time in response to receiving the image file;
after receiving the image file from the user device, communicate a message to the user device via the primary network resources, where the user device is configured to use the image address to retrieve the image file stored in the repository of the financial institution before the secondary network resources post the financial deposit transaction, where the message comprises a link that, when activated by the user, initiates a software application that authenticates the user device prior to the image file being routed to the user device;
receive a user request to retrieve the image file associated with the image address before the secondary network resources post the financial deposit transaction, where the request is initiated by activation of the link by the user to authenticate the user device and the request includes image information to enable the primary network resources to correlate the request to the image address;
after authentication of the user device, use the image information in the request to retrieve the image file from the image address in the repository of the financial institution before the secondary network resources post the financial deposit transaction; and
route the image file from the repository of the financial institution to the user device via the primary network resources, wherein the image file is routed to the user device prior to posting of the financial deposit transaction by the secondary network resources.

8. The computer readable medium of claim 7, the logic further operable to route the image file from the repository of the financial institution to a second user device independently of the posting of the financial transaction.

9. The computer readable medium of claim 8, wherein the logic is further operable to communicate the image file to the user device via a first online account associated with a first owner of a joint banking account and to the second user device via a second online account associated with a second owner of the joint banking account.

10. The computer readable medium of claim 7, wherein the logic is operable to route the image file from the repository to the user device via a first cache prior to the posting of the financial deposit transaction and is further operable to route the image file from the repository to the user device via a second cache in response to a second user request received after the posting of the financial deposit transaction.

11. The computer readable medium of claim 7, the logic further operable to:
receive an updated image file during a pre-determined time period prior to the financial institution initiating the financial deposit transaction; and
replace the original image file with the updated image file.

12. The computer readable medium of claim 7, wherein the logic is further operable to confirm whether the image file is readable in real-time in response to receiving the image file and communicate a request for the user device to send an updated image file in response to a determination that the image file is not readable.

13. A method of routing an image file in a network, the method comprising:
receiving the image file from a user device via primary network resources in the network, wherein the image file depicts a financial instrument for deposit into a financial account of the user, where the network further comprises secondary network resources, the primary network resources configured to receive the image file from the user device and facilitate retrieval of the image file by the user device, the secondary network resources configured to transact a financial deposit transaction based on the financial instrument depicted in the image file;
before the secondary network resources post the financial deposit transaction, creating an association between the image file and an image address that facilitates retrieving the image file by the user from a repository of a financial institution, the association created in real-time in response to receiving the image file;
after receiving the image file from the user device, communicating a message to the user device via the primary network resources, where the user device is configured to use the image address to retrieve the image file stored in the repository of the financial institution before the secondary network resources post the financial deposit transaction, where the message comprises a link that, when activated by the user, initiates a software application that authenticates the user device prior to the image file being routed to the user device;

receiving a user request to retrieve the image file associated with the image address before the secondary network resources post the financial deposit transaction, where the request is initiated by activation of the link by the user to authenticate the user device and the request includes image information to enable the primary network resources to correlate the request to the image address;

after authentication of the user device, using the image information in the request to retrieve the image file from the image address in the repository of the financial institution before the secondary network resources post the financial deposit transaction; and routing the image file from the repository of the financial institution to the user device via the primary network resources, wherein the image file is routed to the user device prior to posting of the financial deposit transaction by the secondary network resources.

14. The method of claim 13, further comprising routing the image file from the repository of the financial institution to a second user device independently of the posting of the financial transaction.

15. The method of claim 14, wherein the image file is communicated to the user device via a first online account associated with a first owner of a joint banking account and to the second user device via a second online account associated with a second owner of the joint banking account.

16. The method of claim 13, wherein the method routes the image file from the repository to the user device via a first cache prior to the posting of the financial deposit transaction and routes the image file from the repository to the user device via a second cache in response to a second user request received after the posting of the financial deposit transaction.

17. The method of claim 13, comprising:
receiving an updated image file during a pre-determined time period prior to the financial institution initiating the financial deposit transaction; and
replacing the original image file with the updated image file.

* * * * *